No. 803,380. PATENTED OCT. 31, 1905.
J. WICKRE.
BUILDING BLOCK.
APPLICATION FILED JULY 1, 1904.
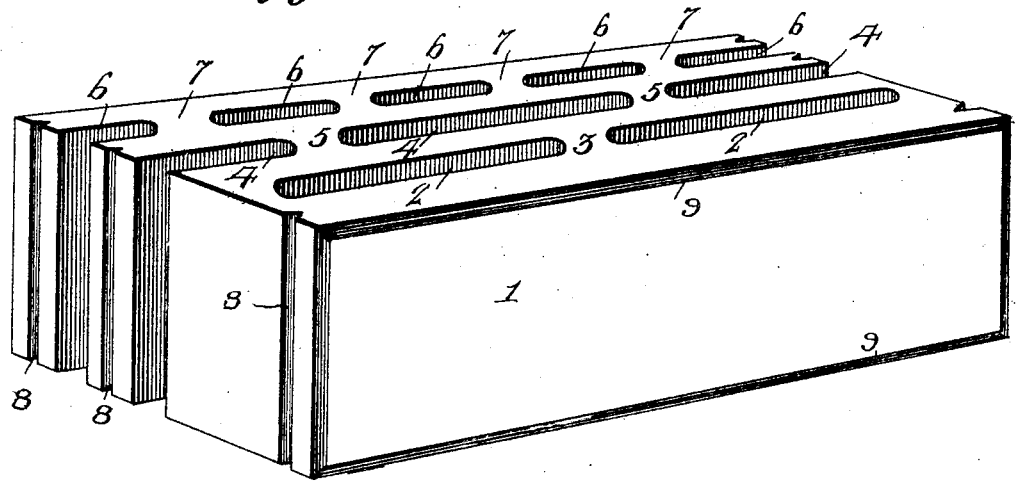
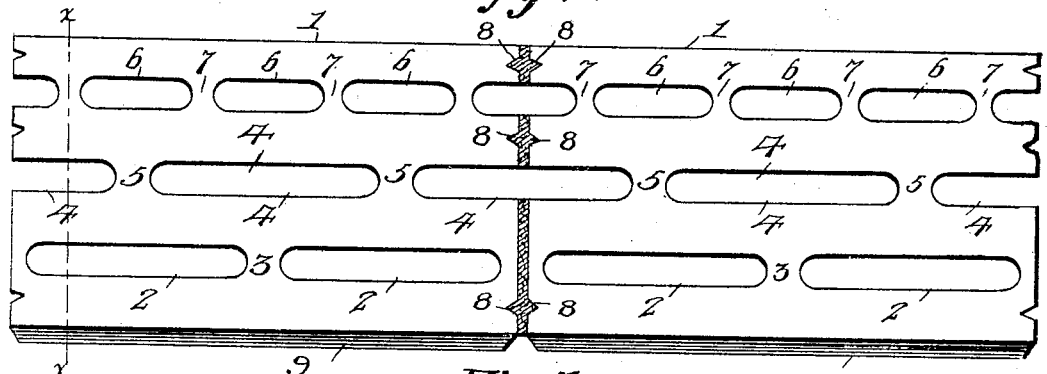
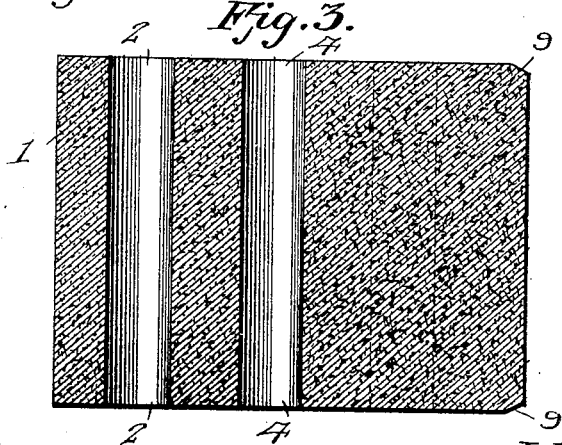
WITNESSES:
Frank B. Hoffman
Katharine Allen
INVENTOR
John Wickre.
BY
Victor J. Evans
Attorney

UNITED STATES PATENT OFFICE.

JOHN WICKRE, OF WILLIAMSBURG, VIRGINIA.

BUILDING-BLOCK.

No. 803,380.      Specification of Letters Patent.      Patented Oct. 31, 1905.

Application filed July 1, 1904. Serial No. 214,978.

*To all whom it may concern:*

Be it known that I, JOHN WICKRE, a citizen of the United States, residing at Williamsburg, in the county of James City and State of Virginia, have invented new and useful Improvements in Building-Blocks, of which the following is a specification.

The invention relates to an improvement in building-blocks structurally designed to afford protection against dampness, heat, or cold.

The main object of the invention resides in the production of a building-block formed with a plurality of air-spaces so arranged as to provide a double or two of such air-spaces in the path of any influence penetrating transversely of the block.

The preferred form of the invention is illustrated in the accompanying drawings, in which—

Figure 1 is a perspective view of a building-block constructed in accordance with my invention. Fig. 2 is a plan showing the arrangement and connection of two horizontally-adjacent blocks. Fig. 3 is an enlarged transverse vertical section of the block, taken on the line *x x* of Fig. 2.

The building-block 1 is provided with a plurality of apertures extending vertically through the block and arranged in a plurality of series, the present instance showing three such series. The apertures of each series are arranged in longitudinal alinement and have a definite relation to the apertures of each of the other series. The apertures 2 of the forward series are narrow elongated openings extending entirely through the block and arranged parallel with and contiguous the forward edge of the block. The apertures are wholly independent of each other, being joined by intervening or solid necks 3. The apertures 4 of the central series are practically similar in size to the apertures 2, being arranged, however, so that their intervening necks 5 are disposed about centrally opposite the apertures 2. The apertures 6 of the rear series are similar to apertures 2 and 4, but of less length, being arranged so that their intervening necks 7 are disposed opposite a portion of both the apertures 2 and 4, as clearly shown in the drawings.

As the necks 5 of the central series of apertures are disposed opposite the central portion of apertures 2 of the forward series and as the necks 7 of the apertures 6 of the rear series are disposed opposite the overlapping portions of apertures 2 and 4, it will be evident that the necks 3, 5, and 7 are arranged in staggered relation throughout the block—that is, no two of such necks are in alinement transversely of the block. From this construction and arrangement it follows that any influence penetrating transversely of the block will intersect at least two of the air-spaces, thus doubly guarding against undesirable influences.

The blocks are to be assembled so that the similar spaces of the superimposed blocks will register, providing uninterrupted air-spaces throughout the height of the walls.

It may be found desirable to form half-spaces at the ends of the bricks in one or more of said series, in which event of course the corresponding half-space of the horizontally-adjacent brick will register and form a complete air-space.

To provide for the effective securing together of the horizontally-adjacent block, I provide the end surfaces with vertically-arranged V-shaped grooves 8, which when the blocks are assembled register with similar grooves in the horizontally-adjacent block to provide practically diamond-shaped recesses to receive the binding-cement, as is usual. These locking-grooves may be of any form desired, their main purpose being to prevent independent lateral movement of the blocks.

The forward edge of the block may be rounded or beveled, if desired, as at 9, or may be otherwise ornamented as desired.

The blocks intended for use at the end of the wall or structure will of course have an unbroken side edge or surface, in which instance the air-space apertures will be formed wholly within the body of the brick.

By forming the air-spaces of at least two of the series at the ends of the block, so as to require the coöperation of the neighboring block to complete the air-space, I provide a double air-space across the cement binding, thus guarding this point.

Having described my invention, what I claim as new is—

1. A building-block formed with a number of apertures arranged in a plurality of series, the apertures of each series having intervening necks, the necks of any one series being out of alinement with the necks of either of the other series, two of the series being formed with half-length apertures at the ends of the blocks.

2. A building-block having inner, outer and central longitudinal rows of vertical apertures, the apertures of the outer and central series being of equal or substantially equal length and the apertures of the inner series of less length, and neck portions intervening the apertures of each series, the intervening necks of any one series being out of alinement with the necks of either of the other series, whereby the necks are arranged in staggered relation and the apertures of the series so related as to present at least two air-spaces to the passage of any influence in any plane transversely of the block throughout the length thereof.

In testimony whereof I affix my signature in presence of two witnesses.

JOHN WICKRE.

Witnesses:
F. R. SAVAGE,
B. LARSON.